(No Model.)
N. JENSEN.
MUCILAGE MOISTENING DEVICE.
No. 554,933. Patented Feb. 18, 1896.
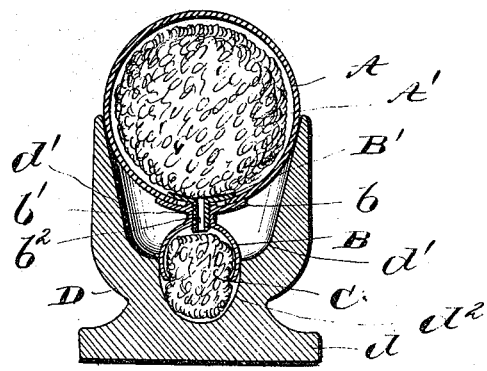
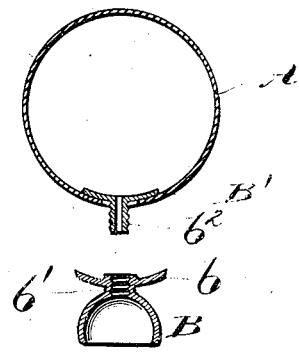

UNITED STATES PATENT OFFICE.

NICHOLAY JENSEN, OF WASHINGTON, DISTRICT OF COLUMBIA.

MUCILAGE-MOISTENING DEVICE.

SPECIFICATION forming part of Letters Patent No. 554,933, dated February 18, 1896.

Application filed November 25, 1895. Serial No. 570,053. (No model.)

*To all whom it may concern:*

Be it known that I, NICHOLAY JENSEN, a citizen of the United States, residing at Washington, in the District of Columbia, have invented certain new and useful Improvements in Mucilage-Moistening Devices; and I do hereby declare the following to be a full, clear, and exact description of the invention, such as will enable others skilled in the art to which it appertains to make and use the same.

My invention is an improvement in devices for moistening mucilage on the sealing-flaps of envelopes and analogous uses; and it consists in the novel features of construction and combination of parts hereinafter described, reference being had to the accompanying drawings, which illustrate one form in which I have contemplated embodying my invention, and said invention is fully disclosed in the following description and claims.

Referring to the said drawings, Figure 1 represents a central sectional view of my improved device, and Fig. 2 represents a detail view of the ball or water receptacle and nipple.

In the drawings, A represents the water receptacle or bulb, composed of rubber preferably in the shape of a hollow sphere or ball and provided with a spherical cup-shaped nipple B, communicating with the interior of the ball for holding a piece of sponge or water-absorbent material. In attaching this nipple I prefer to form it with a flange $b$ for engaging the exterior of the ball A, and a central screw-threaded aperture $b'$ passing through the bottom of the nipple and the flange, as shown.

B' represents a flange for engaging the interior of the ball or receptacle A, and provided with a hollow stem $b^2$ screw-threaded exteriorly, said stem extending through a suitable aperture in the ball or receptacle.

In assembling the parts I take the water-receptacle and make a small aperture in the same, through which a quantity of absorbent material A', preferably sponge, is inserted into the water-receptacle so as to substantially fill the same. The flange B' is then forced into the ball and the stem $b^2$ is made to project through the aperture therein. The nipple is then screwed onto the stem $b^2$, as shown in Fig. 1, thus clamping the wall of the water-receptacle between the flanges $b$ and B'. The central passage in the stem $b^2$ affords a passage connecting the nipple with the interior of the ball. The water-receptacle is then filled with water by compressing the ball so as to force out the air, then inserting the nipple in a glass of water and releasing the ball to allow it to draw the water in. The water will be held in the absorbent material A' and will not run out as would be the case if the ball was simply filled with water without using said absorbent material. A piece of sponge or other absorbent material C is then placed in the nipple B and saturated by slightly pressing the ball A.

D represents the holder or stand for holding the moistening device proper, which is formed, preferably, of glass or china and is so constructed as to prevent the water from being evaporated from the sponge C, which would render the device useless in a short time and require a constant renewal of said sponge. The holder D is cup-shaped and is provided with a broad supporting-base $d$ to prevent its tipping over. The upper edge of the cup or holder is of such diameter that the ball or water-receptacle will fit snugly therein and form a practically air-tight joint. The inner faces of the sides of the cup taper inwardly, as shown at $d'$, and at the bottom curve inward to a point near the center, where a recess $d^2$ is formed in the bottom of the holder, having its mouth very slightly smaller than the diameter of the nipple B. The holder D is of such a depth that when the moistening device is placed therein and the ball has formed an air-tight joint with the mouth of said holder the nipple B will engage and close the mouth of the recess $d^2$, thus confining the sponge C in the said recess and forming two substantially air-tight joints between it and the atmosphere. The recess $d^2$ is of such a depth that the sponge C will not ordinarily quite touch the bottom of the same, so that it is not compressed and its pores are left open. By this construction the evaporation of water from the sponge C is prevented and the device can be used for a very long time without refilling. The sponge C being kept moist continually, will not become hardened by the mucilage it absorbs, as it would if continually exposed to the air. It will only be necessary to remove and cleanse the sponge C at long intervals when it has become so filled with mucilage as to retard the flow of water through it or when it becomes soiled in any other way.

The device is intended to be used upon a desk or table, and the moist sponge C being contained within the holder it cannot soil or moisten any other articles upon such desk.

When it is desired to use the device, as to seal a letter, it will be removed from the cup and the sponge C will be passed lightly over the gummed surface, after which the device will be returned to the cup or holder and the envelope sealed in the usual manner.

By providing the holder with tapering interior surfaces the nipple B will be always guided to the recess $d^2$ in placing the device in the holder without the necessity of care being taken on the part of the user.

What I claim, and desire to secure by Letters Patent, is—

1. A moistening device for gummed surfaces and like uses, comprising among its members the elastic fluid-receptacle, a nipple adapted to contain absorbent material, a holder having a recess in the bottom to receive the said nipple and the upper edges of the walls of the holder to closely engage and support the elastic water-receptacle, substantially as described.

2. A moistening device for gummed surfaces and like uses comprising among its members, the elastic fluid-receptacle, provided with a nipple communicating therewith, a holder provided with tapering walls, and for engaging said elastic receptacle and a recess in the bottom of said holder for receiving said nipple, substantially as described.

3. A moistening device for gummed surfaces and like uses comprising among its members, the elastic fluid-receptacle, the nipple secured thereto and communicating therewith and provided with absorbent material, and the holder having tapering walls, for engaging said elastic receptacle and forming a substantially air-tight joint, said holder having a recess in its bottom to receive said nipple and absorbent material, the diameter of said recess being less than the diameter of said nipple, substantially as described.

In testimony whereof I affix my signature in presence of two witnesses.

NICHOLAY JENSEN.

Witnesses:
L. P. WHITAKER,
J. D. KINGSBERY.